United States Patent
Lee et al.

(10) Patent No.: US 6,493,778 B1
(45) Date of Patent: Dec. 10, 2002

(54) EXTENSIBLE TIME-SHARING BUS STRUCTURE

(75) Inventors: Hsin Chou Lee, Nantou Hsien (TW); Juang-Jung Long, ChuBei (TW)

(73) Assignee: Sunplus Technology Co., Ltd., Hsin-Chu (TW)

(*) Notice: Subject to any disclaimer, the term of this patent is extended or adjusted under 35 U.S.C. 154(b) by 0 days.

(21) Appl. No.: 09/475,107

(22) Filed: Dec. 30, 1999

(51) Int. Cl.[7] ............... G06F 13/00; G06F 12/00; G06F 9/00
(52) U.S. Cl. ................................. 710/110; 709/208
(58) Field of Search ............................ 710/110, 9, 3, 710/100, 107, 33, 28, 305, 45; 709/208; 711/100, 202; 370/537; 365/230.02, 189.02; 340/825.52

(56) References Cited

U.S. PATENT DOCUMENTS

| | | | |
|---|---|---|---|
| 5,191,656 A | * | 3/1993 | Forde, III et al. |
| 5,321,819 A | * | 6/1994 | Szczepanek |
| 5,793,990 A | * | 8/1998 | Jirgal et al. |
| 5,991,841 A | * | 11/1999 | Gafken et al. |
| 6,119,189 A | * | 9/2000 | Gafken et al. |
| 6,393,500 B1 | * | 5/2002 | Thekkath |

* cited by examiner

Primary Examiner—Gopal C. Ray
(74) Attorney, Agent, or Firm—Bacon & Thomas

(57) ABSTRACT

An extensible time-sharing bus structure is provided for a microprocessor to read data from or write data to a memory. An address/data bus transfers addresses and data between the microprocessor and the memory in a time sharing manner. The combination of a the logic levels of two control lines is used to determine that the address/data bus is utilized to transfer addresses, to read data or to write data. Thus, the pin number required in the bus interface is reduced, and the memory capacity can be increased flexibly.

10 Claims, 5 Drawing Sheets

EXTENSIBLE TIME-SHARING BUS STRUCTURE

BACKGROUND OF THE INVENTION

1. Field of the Invention

The present invention relates to the field of computer bus structure, and especially to a time-sharing bus structure capable of extending address space.

2. Description of Related Art

Generally, the conventional micro-control system is constructed by a microprocessor, a memory, and I/O devices. As shown in FIG. 5, the microprocessor 55 performs data access to the memory 54 by employing an address bus 51, a data bus 52 and a write/ read control line 53. The address bus 51 is provided for carrying addresses of the memory 54 (or I/O devices). The width of the address bus 51 thus represents the size of the memory space. For example, a 16-bit address bus, which has 16 address lines, represents that a maximum memory capacity is 64 k bytes.

When the aforesaid micro-control system is desired to increase its memory capacity, the width of the address bus 51 is necessary to be increased. For example, if the memory capacity is increased to 4M bytes, the number of address lines must be increased to 22. As a result, not only the cost of PCB (Printed Circuit Board) is increased, but also the cost of bonding and packaging for the memory is increased. Moreover, after the memory capacity has been designed, it can not be further extended. Therefore, the use of such a memory system is not satisfactory. Accordingly, there is a need to have a novel bus structure that can mitigate and/or obviate the aforementioned problems.

SUMMARY OF THE INVENTION

Accordingly, the primary object of the present invention is to provide an extensible time-sharing bus structure for saving the pin number of an integrated circuit chip.

Another object of the present invention is to provide an extensible time-sharing bus structure for conveniently extending the memory capacity.

In order to achieve the aforesaid objects, there is provided an extensible time-sharing bus structure for transferring data between a master device and at least one slave device. The bus structure has a slave bus interface provided by said slave device and a master bus interface provided by the master device. The master bus interface is connected to the slave bus interface through an address/data bus and at least two control lines. The address/data bus transfers data and address in a time-sharing manner between the master device and the slave device. The at least two control lines are driven by the master device to be at a first logic level or at a second logic level, such that the master device and the slave device utilize the address/data bus for transferring an address, reading data, or writing data, based on a combination of the logic levels of the at least two control lines.

The various objects and advantages of the present invention will be more readily understood from the following detailed description when read in conjunction with the appended drawing.

DETAIL DESCRIPTION OF A PREFERRED EMBODIMENT

Figure 1:
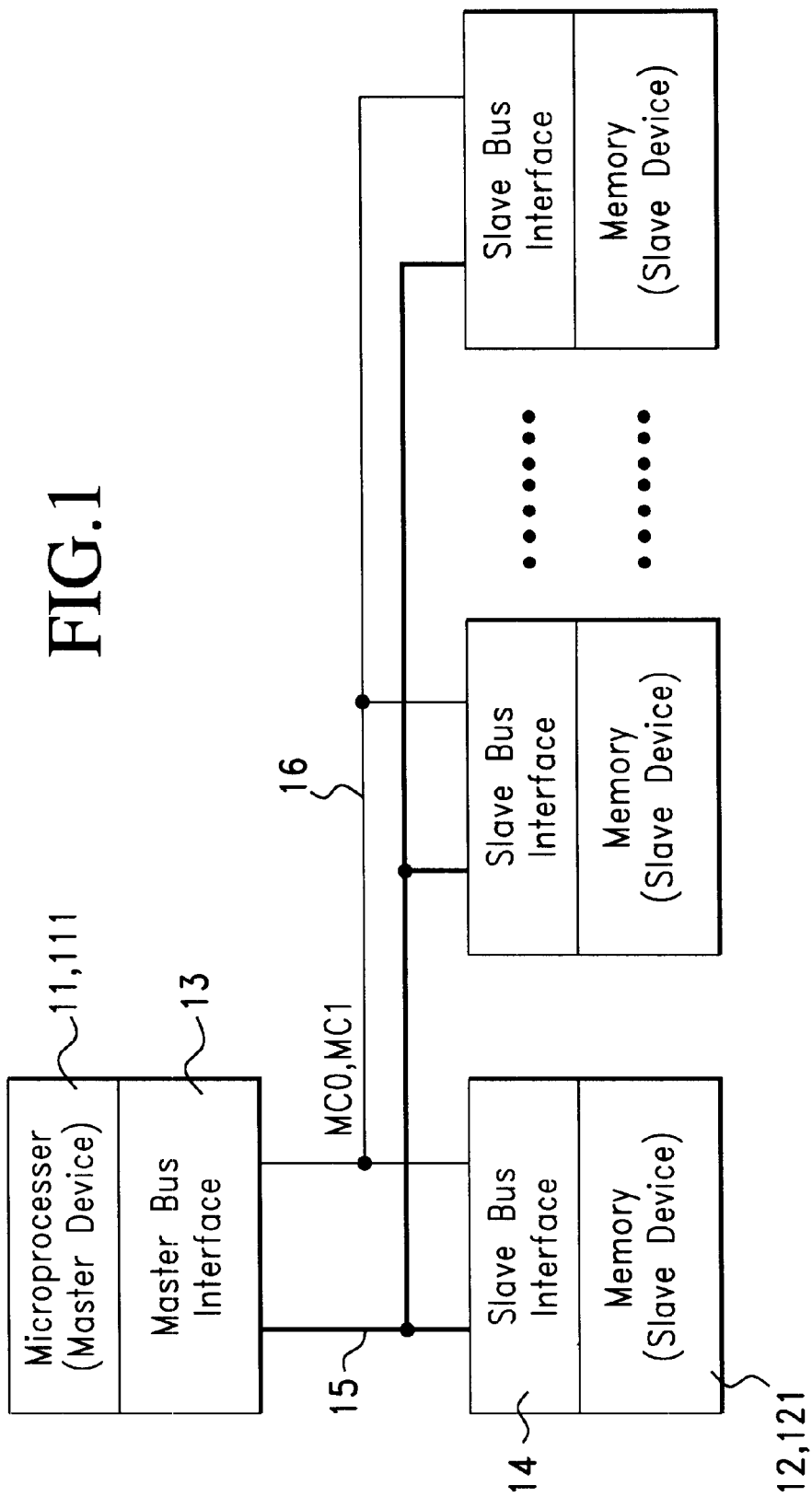
FIG. 1 is a schematic view showing a preferred embodiment of the extensible time-sharing bus structure in accordance with the present invention.

With reference to FIG. 1, a preferred embodiment of the extensible time-sharing bus structure according to the present invention is illustrated, which is used for transferring data between a master device 11 and at least one slave device 12. In this preferred embodiment, the master device 11 is a microprocessor 111 and the slave device 12 is a memory 121. The extensible time-sharing bus structure includes a master bus interface 13 provided by the master device 11 and a salve bus interface 14 provided by the slave device 12. The master bus interface 13 is connected to the slave bus interface 14 by a N-bit address/data bus 15 and at least two control lines 16. The address/data bus 15 is provided to transfer address and data information between the microprocessor 111 and the memory 121. The control lines 16 are provided to determine whether the address/data bus 15 is utilized to transfer addresses, read data, or write data.

In this preferred embodiment, the extensible time-sharing bus structure has two control lines MC0 and MC1. In order to read or write data, the two control lines MC0 and MC1 are driven by the microprocessor 111 to be in a high logic level or a low logic level. Therefore, four possible logic combinations are provided. Accordingly, the use of the address/data bus 15 can be defined according to the logic status of the control lines MC0 and MC1, as that shown in the following Table:

TABLE 1

| MC1 logic status | MC0 logic status | Address/data bus |
| --- | --- | --- |
| High | Low | High address |
| High | High | Low address |
| Low | High | Read data |
| Low | Low | Write data |

That is, when the control line MC1 is at high logic level and the control line MC0 is at low logic level, the address/data bus 15 is provided to transfer the high address portion of the address for addressing the memory 121. When the control line MC1 is at high logic level and the control line MC0 is also at high logic level, the address/data bus 15 is provided to transfer the low address portion of the address for addressing the memory 121. When the control line MC1 is at low logic level and the control line MC0 is at high logic level, the address/data bus 15 is provided to transfer data read from the memory 121. When the control line MC1 is at low logic level and the control line MC0 is at low logic level, the address/data bus 15 is provided to transfer data to be written into the memory 121.

Figure 2:
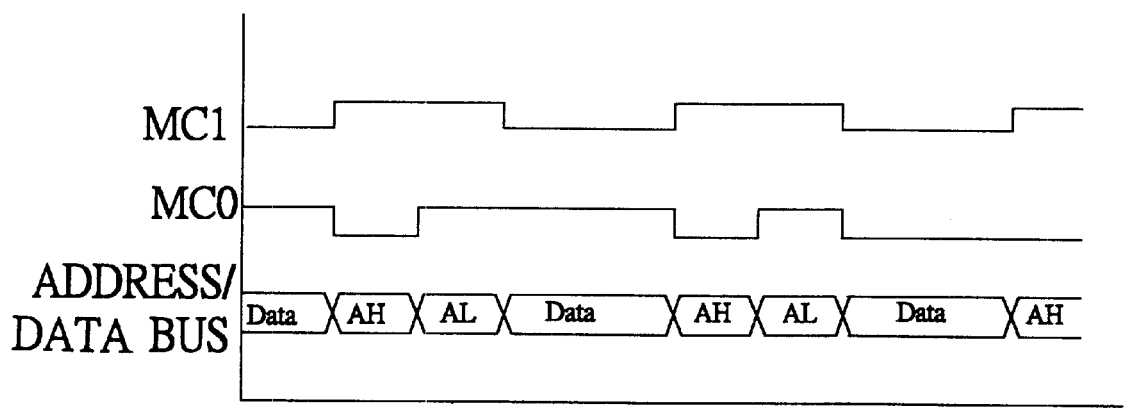
FIG. 2 is a timing diagram for a preferred embodiment of the extensible time-sharing bus structure in accordance with the present invention.

With respect to the combination of the logic status provided by the control lines MC0 and MC1 in Table 1, a clock cycle of the address/data bus 15 can be divided into three phases by employing the time-sharing concept. As such, with reference to FIG. 2, data can be read from or written to the slave bus interface 14 by sequentially employing the high address bus (AH, N bits), low address bus (AL, N bits) and data bus (Data, N bits) (or in an order of low address, high address, and data bus) to accomplish a data access operation.

Figure 3:
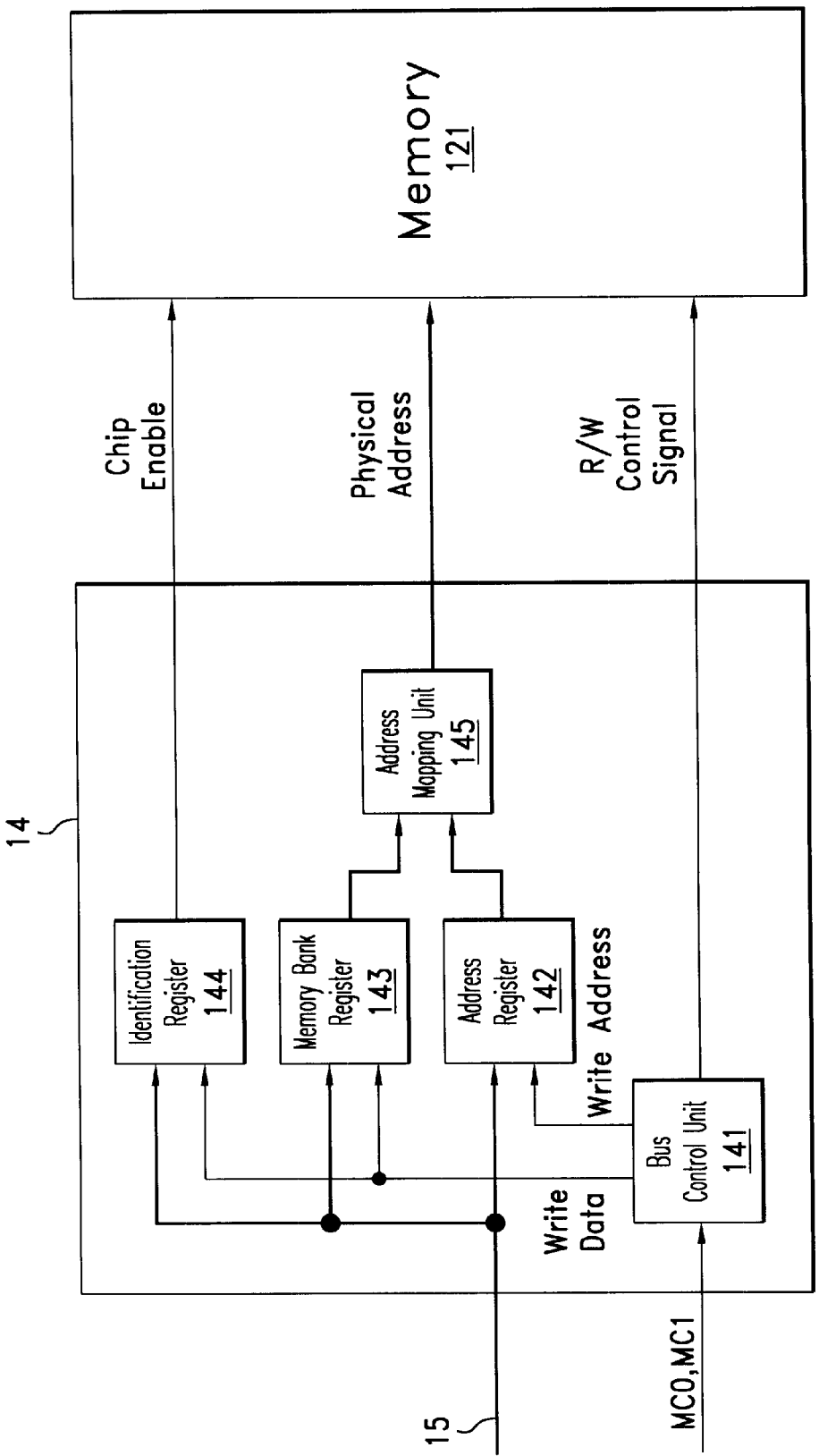
FIG. 3 is a functional block diagram of a slave bus interface of the extensible time-sharing bus structure in accordance with the present invention.

With reference to FIG. 3, the slave bus interface 14 has a bus control unit 141 implemented by logic gates to decode the combination of the logic status of the control lines MC0 and MC1, thereby determining the type of information to be transferred on the address/data bus 15. Therefore, a proper write or read control signal can be sent to the memory 121 for accomplishing a correct memory access operation.

The slave bus interface 14 has an address register 142 for holding the address of the memory to be accessed. That is, when the bus control unit 141 determines that the address/data bus 15 is transferring an address, the address is held in the address register 142. In this preferred embodiment, the address register 142 has a flip-flop for holding the high address portion of the address and a latch for holding the low address portion of the address, so as to hold the complete address to identify a memory location. Therefore, the total address space that can be addressed is $2^{2N}$.

Figure 4:
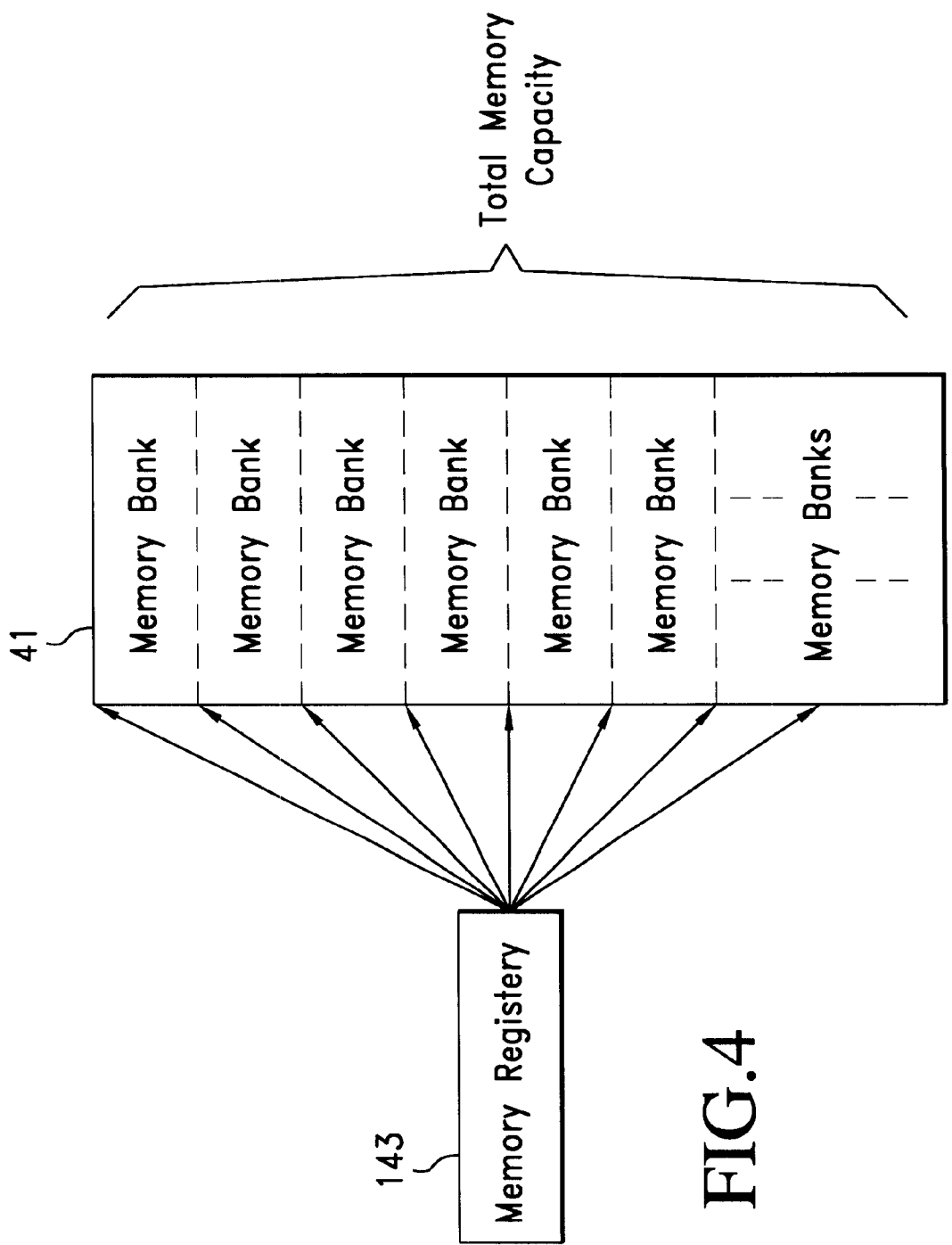
FIG. 4 shows an example to depict the memory mapping employed in the extensible time-sharing bus structure in accordance with the present invention.
Figure 5:
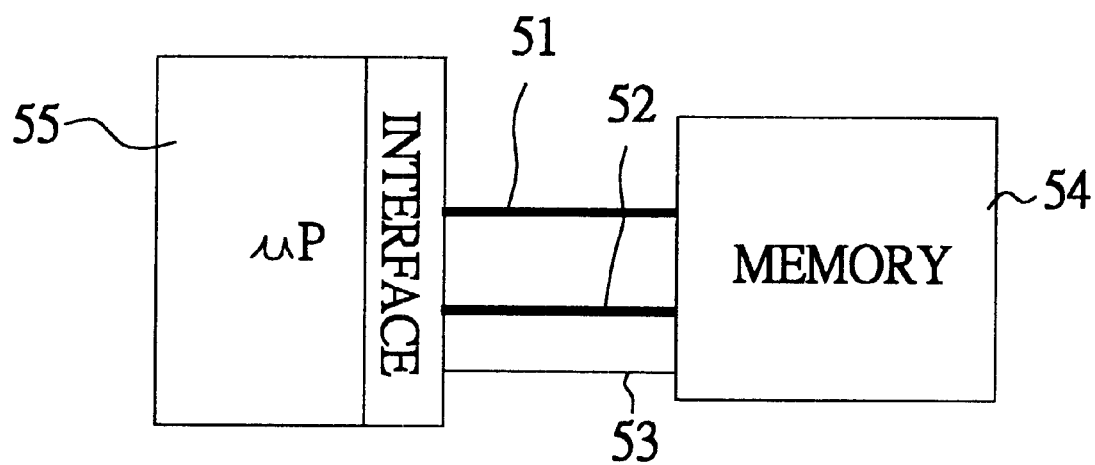
FIG. 5 is a schematic view showing a conventional bus structure.

The address held in the address register 142 is thus used to address the memory 121 for accessing a specific memory location. To further extend the memory capacity that can be addressed, the slave bus interface 14 is provided with a memory bank register 143 for recording the locations of a plurality of memory banks provided by the memory 121. As such, the content of the memory bank register 143 is combined with the content of the address register 142 to map to a physical memory address through the processing of an address mapping unit 145. As shown in FIG. 4, in this preferred embodiment, the memory bank register 143 has N bits, and thus, there are $2^N$ memory banks 41 that can be recorded. Further in combination with the $2^{2N}$ address space provided by the address register 142, there is $2^{3N}$ address space obtained after memory mapping.

Referring to FIG. 3, the slave bus interface 14 further has an identification register 144 for recording the identification number of the slave bus interface 14. When the master bus interface 13 sends an identification number that is identical to the number of the slave bus interface 14, the slave bus interface 14 is enabled. Therefore, the master device 11 can operate with a plurality of slave device 12 and enable one of them for data access as required, thereby further extending the accessible address space.

In this preferred embodiment, the identification register 144 has N bits. Therefore, there are $2^N$ slave devices 12 that can be identified. Therefore, with the use of the address register 142, the memory register 143 and the identification register 144, there is obtained $2^{4N}$ address space, in stead of only $2^N$ address space if the conventional N-bit bus is used. Besides, if the identification register 144 is not used, there still is $2^{3N}$ address space that can be obtained. Because of having these address spaces, in system design, the memory space can be increased or decreased freely without being restricted by the width of the address bus.

Taking a practical example, if a memory with capacity of 1M×8 bits is to be accessed and a conventional bus structure is used, there are at least 29 pins (20 address bus pins, 8 data bus pins, 1 read/write control pin) that must be provided to connect to the memory for reading or writing data. If the extensible time-sharing bus structure in accordance with the present invention is used, only an 8-bit address/data bus 15 and two control lines MC1 and MC0 are required. The master bus interface 13 thus simply provides signals for these 10 pins. For the slave bus interface 14, a 4-bit memory bank register 143 can be used to achieve the purpose of accessing the external memory 121 ($2^{(8*2+4)}=2^{20}=1$M). Moreover, if additional eight times memory capacity are provided, only a 3-bit identification register 144 is required for accessing the memory with a capacity of 8M×8 bits.

Accordingly, it is appreciated that the use of the extensible time-sharing bus structure in accordance with the present invention can achieve the following advantages:

(1) Flexible Memory Capacity: The address space can be extended even though the width of the address bus is fixed. The user may freely increase or decrease the memory capacity in using a microprocessor based on the need of the applications without replacing the microprocessor.

(2) Saving Cost: The number of pads of the microprocessor for connecting to the memory is not increased with the increment of the memory capacity, thereby miniaturizing the pads required. Therefore, the system PCB complexity can be reduced to save the cost. Moreover, the cost in wire bonding and packaging can also be reduced. In addition, the chip size of the microprocessor can be significantly reduced when an application with large memory capacity is employed, because the pad number is fixed and thus the chip size won't be affected by the increment of pad number, which is known to severely limit a chip in reducing its size.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An extensible time-sharing bus structure for transferring data between a master device and at least one slave device, said bus structure comprising:

a slave bus interface provided by said slave device; and a master bus interface provided by said master device and connected to said slave bus interface through an address/data bus and at least two control lines, said address/data bus transferring data and addresses in a time-sharing manner between said master device and said slave device, said at least two control lines being driven by said master device to be at a first logic level or at a second logic level, such that said master device and said slave device utilize said address/data bus selectively for transferring an address, reading data, and writing data based on a combination of the logic levels of said at least two control lines, wherein said slave bus interface has an address register for latching an address to access data, and wherein said slave bus interface further has a memory bank register for recording a plurality of memory bank locations provided by said slave device, and a memory bank location is combined with said address register to generate a physical address by memory mapping.

2. The extensible time-sharing bus structure as claimed in claim 1, wherein said slave bus interface further has an identification register for recording an identification number of said slave bus interface, such that said slave bus interface is enabled when an identification number provided by said master device is identical to an identification number recorded in said slave bus interface.

3. The extensible time-sharing bus structure as claimed in claim 2, wherein said at least two control lines includes a first control line and a second control line.

4. The extensible time-sharing bus structure as claimed in claim 3, wherein said address/data bus is utilized to transfer data when said second control line is at said first logic level.

5. The extensible time-sharing bus structure as claimed in claim 4, wherein said address/data bus is utilized to read data when said first control line is at said second logic level, and said address/data bus is utilized to write data when said first control line is at said first logic level.

6. The extensible time-sharing bus structure as claimed in claim 5, wherein said address/data bus is utilized to transfer an address when said second control line is at said second logic level.

7. The extensible time-sharing bus structure as claimed in claim 6, wherein said address/data bus is utilized to transfer a high address when said first control line is at said first logic level, and said address/data bus is utilized to transfer a low address when said first control line is at said second logic level.

8. The extensible time-sharing bus structure as claimed in claim 7, wherein said address register has a flip-flop and a latch for holding said high address and said low address, respectively.

9. The extensible time-sharing bus structure as claimed in claim 8, wherein said master device is a microprocessor, and said slave device is a memory.

10. The extensible time-sharing bus structure as claimed in claim 9, wherein said second logic level is of low voltage level, and said first logic level is of high voltage level.

* * * * *